US007828642B2

(12) United States Patent
Duhamel

(10) Patent No.: US 7,828,642 B2
(45) Date of Patent: Nov. 9, 2010

(54) METHOD OF OPERATING A GROUPED SELECTION GAME

(76) Inventor: Gérald Duhamel, 290 St-Damase Street, Drummondville, Québec (CA) J2B 6J5

( * ) Notice: Subject to any disclaimer, the term of this patent is extended or adjusted under 35 U.S.C. 154(b) by 828 days.

(21) Appl. No.: 10/859,454

(22) Filed: May 27, 2004

(65) Prior Publication Data

US 2004/0259624 A1 Dec. 23, 2004

Related U.S. Application Data

(60) Provisional application No. 60/473,260, filed on May 27, 2003.

(51) Int. Cl.
*A63F 9/24* (2006.01)
*A63F 13/00* (2006.01)

(52) U.S. Cl. ............................ 463/18; 463/12; 463/16; 463/17

(58) Field of Classification Search ..................... 463/1, 463/9–21, 25–27, 30–31, 36, 38, 40, 42, 463/46; 273/138.1, 138.2, 139, 292
See application file for complete search history.

(56) References Cited

U.S. PATENT DOCUMENTS

| | | | | |
|---|---|---|---|---|
| 5,725,428 | A * | 3/1998 | Achmuller | 463/20 |
| 6,033,307 | A * | 3/2000 | Vancura | 463/20 |
| 6,155,925 | A * | 12/2000 | Giobbi et al. | 463/20 |
| 6,159,097 | A * | 12/2000 | Gura | 463/20 |
| 6,186,505 | B1 * | 2/2001 | Perrie et al. | 273/274 |
| 6,186,894 | B1 * | 2/2001 | Mayeroff | 463/20 |
| 6,309,300 | B1 | 10/2001 | Glavich | |
| 6,346,043 | B1 * | 2/2002 | Colin et al. | 463/20 |
| 6,439,995 | B1 * | 8/2002 | Hughs-Baird et al. | 463/20 |
| 6,511,375 | B1 * | 1/2003 | Kaminkow | 463/20 |
| 6,575,830 | B2 | 6/2003 | Baerlocher | |
| 6,585,591 | B1 | 7/2003 | Baerlocher | |
| 6,599,193 | B2 | 7/2003 | Baerlocher | |
| 6,609,971 | B2 | 8/2003 | Vancura | |
| 6,652,378 | B2 * | 11/2003 | Cannon et al. | 463/20 |
| 6,685,561 | B2 | 2/2004 | Anderson | |
| 6,688,975 | B2 * | 2/2004 | Baerlocher et al. | 463/16 |
| 6,722,982 | B2 * | 4/2004 | Kaminkow et al. | 463/25 |
| 6,722,983 | B2 | 4/2004 | Kaminkow et al. | |
| 6,726,565 | B2 | 4/2004 | Hughs-Baird | |
| 6,749,504 | B2 | 6/2004 | Hughs-Baird | |
| 6,776,711 | B1 * | 8/2004 | Baerlocher | 463/16 |
| 6,783,458 | B2 | 8/2004 | Mead | |
| 6,793,578 | B2 | 9/2004 | Luccesi | |
| 6,796,899 | B2 | 9/2004 | Baerlocher | |

(Continued)

OTHER PUBLICATIONS

First Report—IP Australia, Oct. 22, 2009 (5 pages).

*Primary Examiner*—John M Hotaling, II
*Assistant Examiner*—Steven J. Hylinski
(74) *Attorney, Agent, or Firm*—Benoît & Coté, s.e.n.c.

(57) ABSTRACT

A method of operating a game of chance comprising displaying a plurality of groups comprising positions a plurality of selectable objects, each being associated with a hidden value. A player selection of a group and/or a selectable object is received, a group-object association is created and a position from said group is assigned to said object. Upon occurrence of an ending condition, a prize is awarded. A game apparatus and a computer program applying the method are also provided.

19 Claims, 8 Drawing Sheets

U.S. PATENT DOCUMENTS

| | | | | |
|---|---|---|---|---|
| 6,802,775 | B2 | 10/2004 | Baerlocher | |
| 7,037,191 | B2 * | 5/2006 | Rodgers et al. | 463/16 |
| 7,252,590 | B2 * | 8/2007 | Palmer et al. | 463/16 |
| 7,377,849 | B2 * | 5/2008 | Baerlocher et al. | 463/20 |
| 2002/0022514 | A1 * | 2/2002 | Randall et al. | 463/20 |
| 2002/0039919 | A1 * | 4/2002 | Joshi et al. | 463/20 |
| 2002/0045475 | A1 * | 4/2002 | Glavich et al. | 463/20 |
| 2002/0052232 | A1 * | 5/2002 | Kaminkow | 463/20 |
| 2002/0086725 | A1 * | 7/2002 | Fasbender et al. | 463/11 |
| 2002/0142832 | A1 * | 10/2002 | Loose et al. | 463/30 |
| 2002/0183105 | A1 | 12/2002 | Cannon et al. | |
| 2003/0045345 | A1 * | 3/2003 | Berman | 463/20 |
| 2003/0060273 | A1 | 3/2003 | Kaminkow | |
| 2003/0064769 | A1 * | 4/2003 | Muir | 463/16 |
| 2003/0073477 | A1 | 4/2003 | Baerlocher | |
| 2003/0104856 | A1 * | 6/2003 | Wolf | 463/16 |
| 2003/0176215 | A1 | 9/2003 | Palmer | |
| 2003/0186739 | A1 * | 10/2003 | Paulsen et al. | 463/25 |
| 2003/0199300 | A1 | 10/2003 | Kaminkow | |
| 2003/0207710 | A1 | 11/2003 | Rodgers | |
| 2003/0216163 | A1 | 11/2003 | Kaminkow | |
| 2004/0038733 | A1 * | 2/2004 | Walker et al. | 463/25 |
| 2004/0053665 | A1 | 3/2004 | Baerlocher | |
| 2004/0062378 | A1 | 4/2004 | Peterson | |
| 2004/0077403 | A1 | 4/2004 | Maya | |
| 2004/0157658 | A1 * | 8/2004 | Rothkranz | 463/20 |
| 2007/0129135 | A1 * | 6/2007 | Marks et al. | 463/20 |

* cited by examiner

METHOD OF OPERATING A GROUPED SELECTION GAME

CROSS-REFERENCE TO RELATED APPLICATIONS

This application claims priority under 35USC§119(e) of U.S. provisional patent application(s) 60/473,260 filed May $27^{th}$ 2003, the specification of which is hereby incorporated by reference.

TECHNICAL FIELD

The present invention relates to a game of chance offering a grouped selection bonus feature.

BACKGROUND OF THE INVENTION

Gambling has evolved a lot during the last few years, and game manufacturers are always searching for new methods to interest and entertain players. Players are always demanding more features and payout schemes.

Improvements in these kinds of games are desired to enhance the player's interest and entertainment.

SUMMARY OF THE INVENTION

In an embodiment, the present invention provides a method of operating a game of chance comprising displaying a plurality of groups comprising positions and a plurality of selectable objects, each being associated with a hidden value. A player selection of a group and/or a selectable object is received, a group-object association is created and a position from said group is assigned to said object. Upon occurrence of an ending condition, a prize is awarded.

In another embodiment, the present invention provides a game apparatus comprising display means to display (a) a plurality of groups comprising positions and (b) a plurality of selectable objects, each being associated with a hidden value; input means to receive a player selection of a group and/or a selectable object; controller means to create a group-object association based on said player selection and to assign a position from said group to said object; and awarding means to award a prize based upon player selections upon occurrence of an ending condition.

In yet another embodiment, the present invention provides a computer program embodied on a computer readable medium or in processor-readable memory having codes adapted to display a plurality of groups comprising positions, and a plurality of selectable objects, each being associated with a hidden value. A player selection of a group and/or a selectable object is received, a group-object association is created and a position from said group is assigned to said object. A prize is awarded based on player selections upon occurrence of an ending condition.

In still another embodiment, the present invention provides a computer program carried on an electrical or electromagnetic signal having codes adapted to display a plurality of groups comprising positions, and a plurality of selectable objects, each being associated with a hidden value. A player selection of a group and/or a selectable object is received, a group-object association is created and a position from said group is assigned to said object. A prize is awarded based on player selections upon occurrence of an ending condition.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
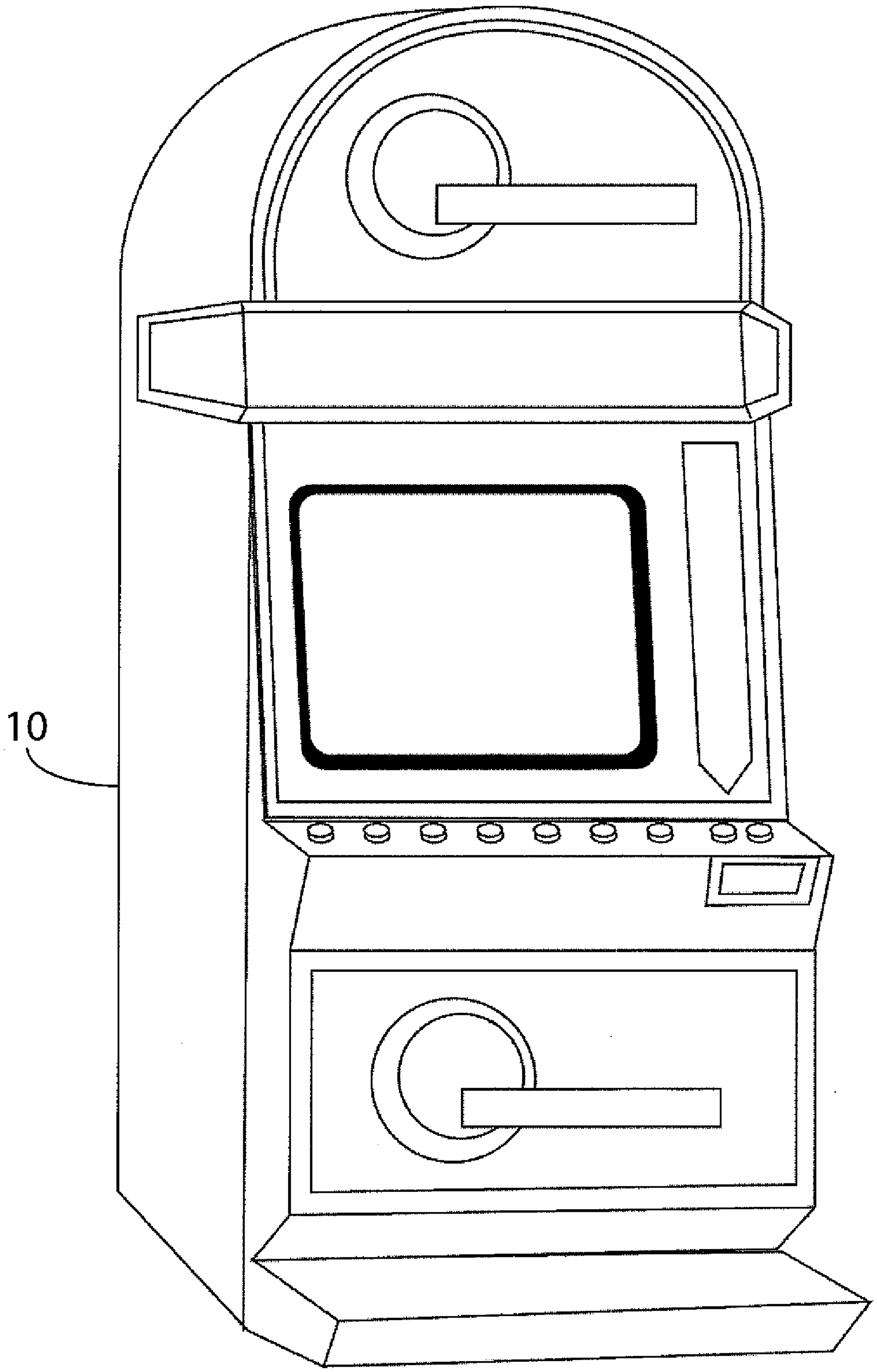
FIG. 1 is a schematic diagram showing a perspective view of a gaming machine suitable for the present invention.
Figure 2:
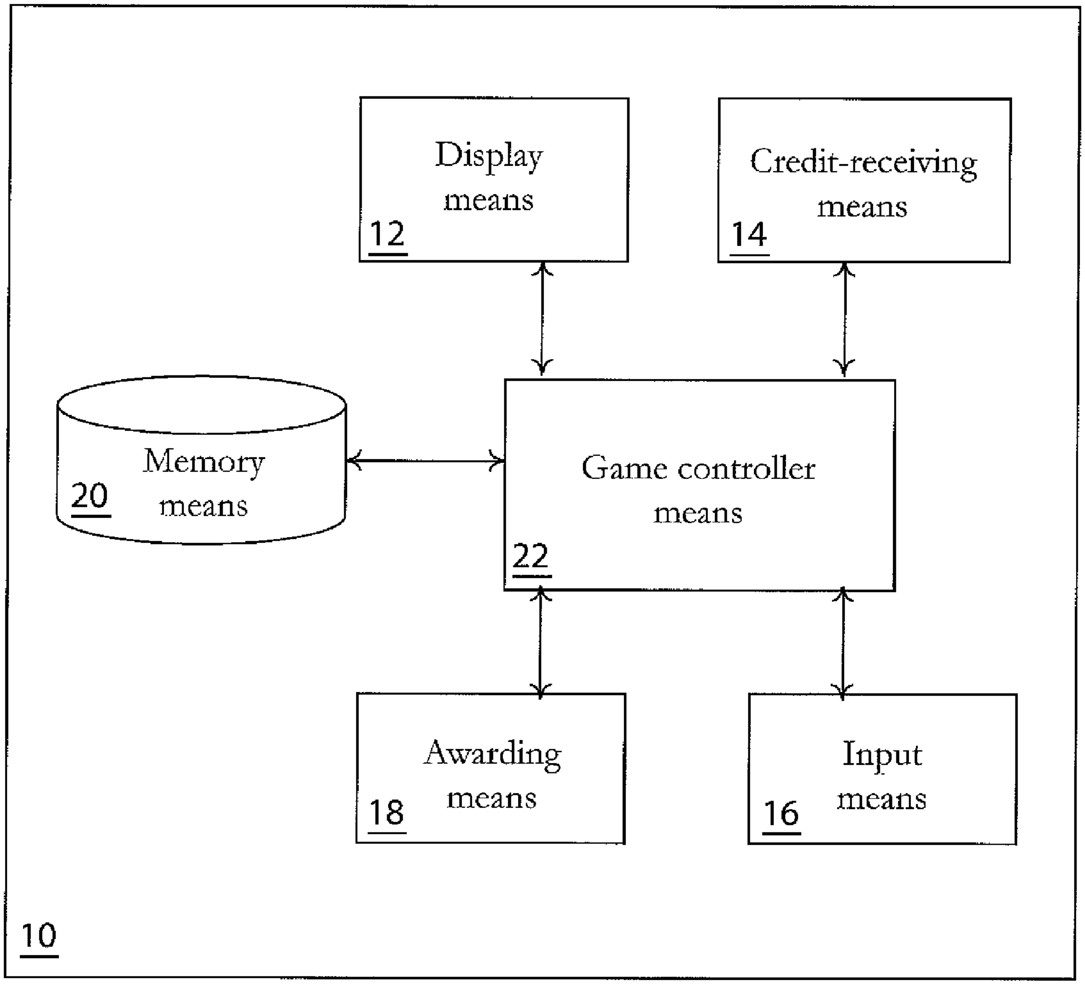
FIG. 2 is a bloc diagram illustrating the components of the gaming machine of FIG. 1.

The present invention is preferably carried out on a game apparatus, as illustrated in FIGS. 1 and 2. The game apparatus 10 comprises display means 12, such as a video screen, a LCD screen or mechanical reels; credit-receiving means 14 such as a card reader, or a coin and/or bill acceptor; input means 16, such as buttons, levers or a touch screen; awarding means 18, such as a ticket printer, a card reader or a hopper; memory means 20 and a game controller means 22. Communication means (not shown) may also be added to communicatively link the game apparatus to at least another game apparatus.

More precisely, the present invention provides a game apparatus 10 comprising display means 12 to provide a plurality of positions divided into a plurality of groups and to display a plurality of selectable objects, each being associated with a hidden value; input means 16 to receive a player selection of a group and/or a selectable object; controller means 22 to create a group-object association based on said player selection; and awarding means 18 to award a prize based upon player selections upon occurrence of an ending condition.

The invention may also be applied in a computer program, or at a remote terminal, the game information (not shown) being distributed via a network, such as linked apparatus or the Internet, or broadcasted using an electrical or electromagnetic signal.

The present invention describes a grouped selection game of chance. The player is offered a plurality of selectable objects, which by selection are placed in a plurality of positions divided into a plurality of groups. The player is offered a prize when all the positions of a group or all positions of the game are occupied. This game may be played as a game, as a bonus game; as a multi-play bonus or be played all in one access; be played individually or be shared by a plurality of players.

Figure 3:
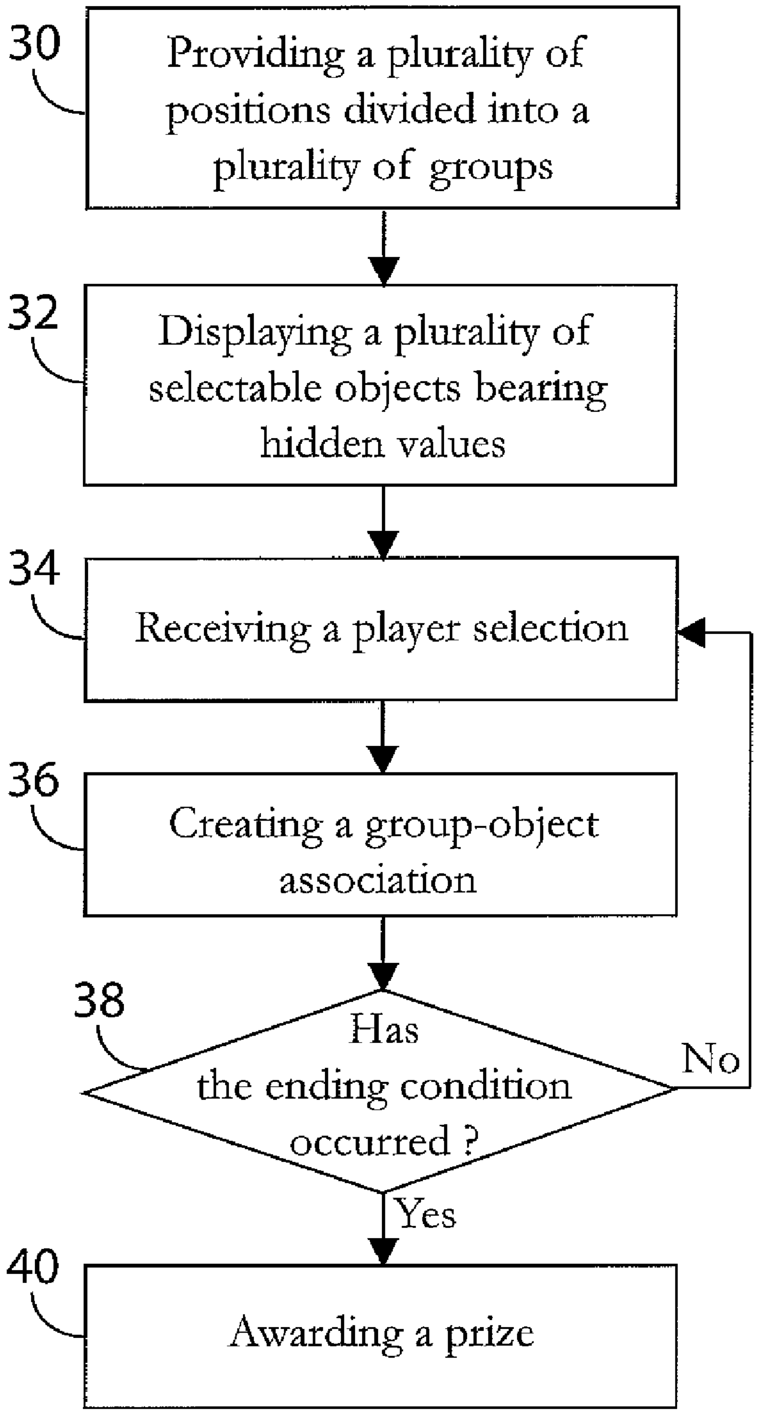
FIG. 3 is a flow chart of a single play game process in accordance with the present invention.

A first preferred embodiment of the present invention is to play the game as a single play, being a secondary game or a stand-alone game. The player begins the game and plays it to its end. FIG. 3 illustrates a game process for such an embodiment. At the beginning of the game, a plurality of positions, not necessarily displayed, divided into a plurality of groups is provided 30 to the player. A plurality of selectable objects, each associated with a hidden value, are displayed 32. A player selection of a group and/or selectable object is received 34 and completed by a random number generator, and a group-object association is created 36. It is then determined whether or not an ending condition occurs 38. Examples of occurrence of ending conditions 38 include the situation when the positions of a group are all occupied, when a predetermined number of selections has been made, or when all positions of all groups are occupied. Upon occurrence of this ending condition, a prize is awarded 40 based on the player selections. If the ending condition does not occur, a new player selection is received 34. The selection 34, association creation 36 and analysis 38 steps are repeated until the ending condition occurs.

FIG. 4 illustrates four possible embodiments for receiving and completing the player selection 34 from FIG. 3. In the first two embodiments, the player chooses either a group or a selectable object as illustrated in FIGS. 4*a* and 4*b*. After a player selection of a group 45 or of a selectable object 49 is received, the game selects the other element—selectable object 47 or group 51. In the embodiments of FIGS. 4*a* and 4*b*, the game selection can be random or follow a predetermined order.

Figure 4A:
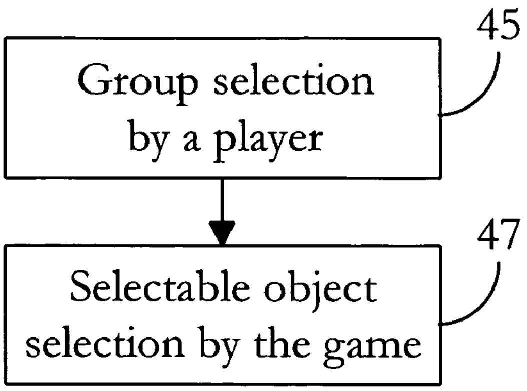
FIGS. 4*a* to 4*d* are detailed flow charts showing various embodiments of the step of receiving a player selection of FIG. 3.
Figure 4B:
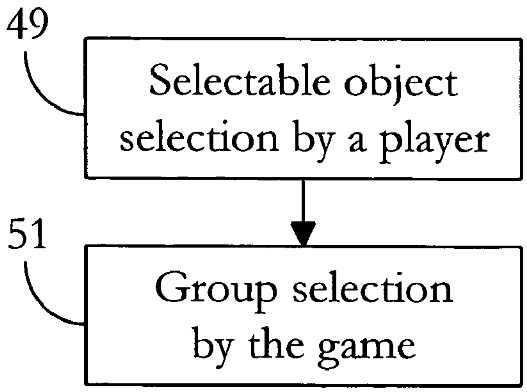
Figure 4C:
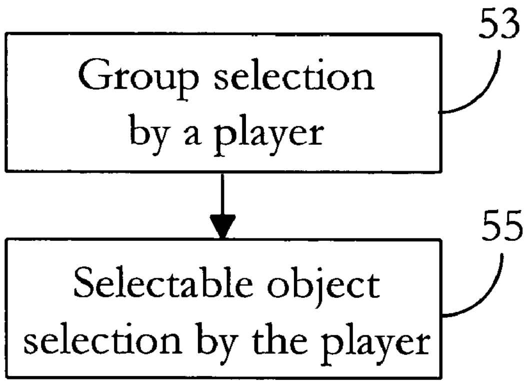
Figure 4D:
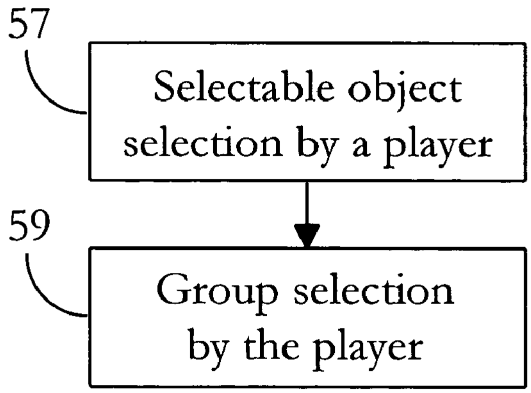

In the next two embodiments, again the player selection comprises both a group and a selectable object as illustrated in FIGS. 4*c* and 4*d*. FIG. 4*c* describes a situation where a group 53 is selected before a selectable object 55 is selected. FIG. 4*d* illustrates the opposite situation: a selectable object is selected 57 before a group 59 is selected. The embodiment described in FIG. 4*d* involves more strategy since the player can decide to put all small values in a group and bigger values together in another group to increase his chances of winning a bigger prize.

Figure 5:
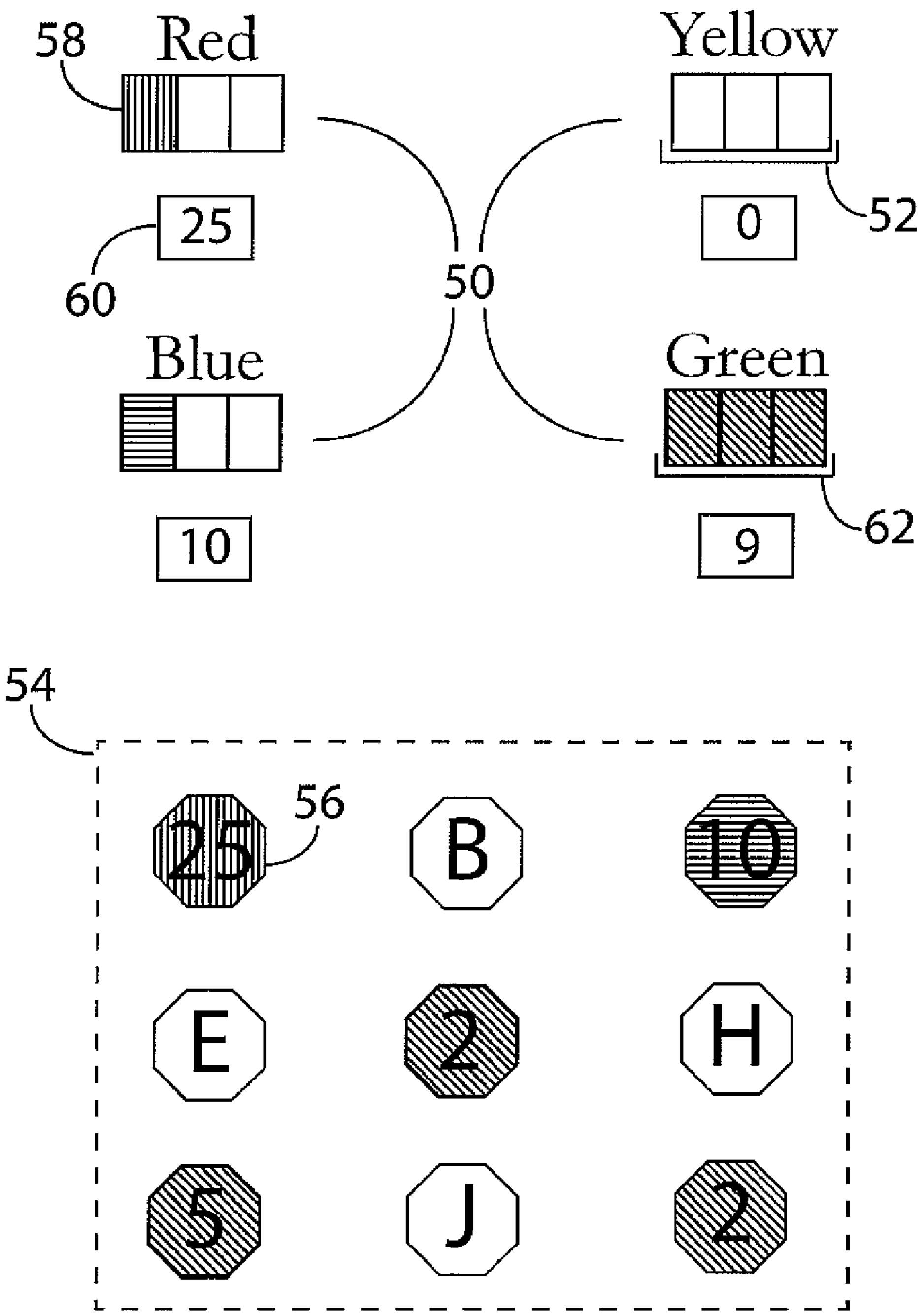
FIG. 5 is a screen shot of a single play game in accordance with an embodiment of the present invention.

An example of a single play embodiment is provided on FIG. 5. The number of groups, positions per groups and selectable objects are predetermined: the player is provided with four (4) groups 50, each having three (3) positions 52 and nine (9) selectable objects 54. Since a prize is awarded as soon as the positions of a group are all occupied 62, the number of selectable objects may be inferior or superior to the number of positions. The player selects a group, then a selectable object. Upon selection of the object 56, a position in the selected group is marked as occupied 58, the selected object hidden value is revealed, and is added to a counter 60 associated with the selected group and displaying the sum of the values of the selectable objects associated with this group so far. In FIG. 5, objects B, E, H, and J have not yet been selected.

Figure 6:
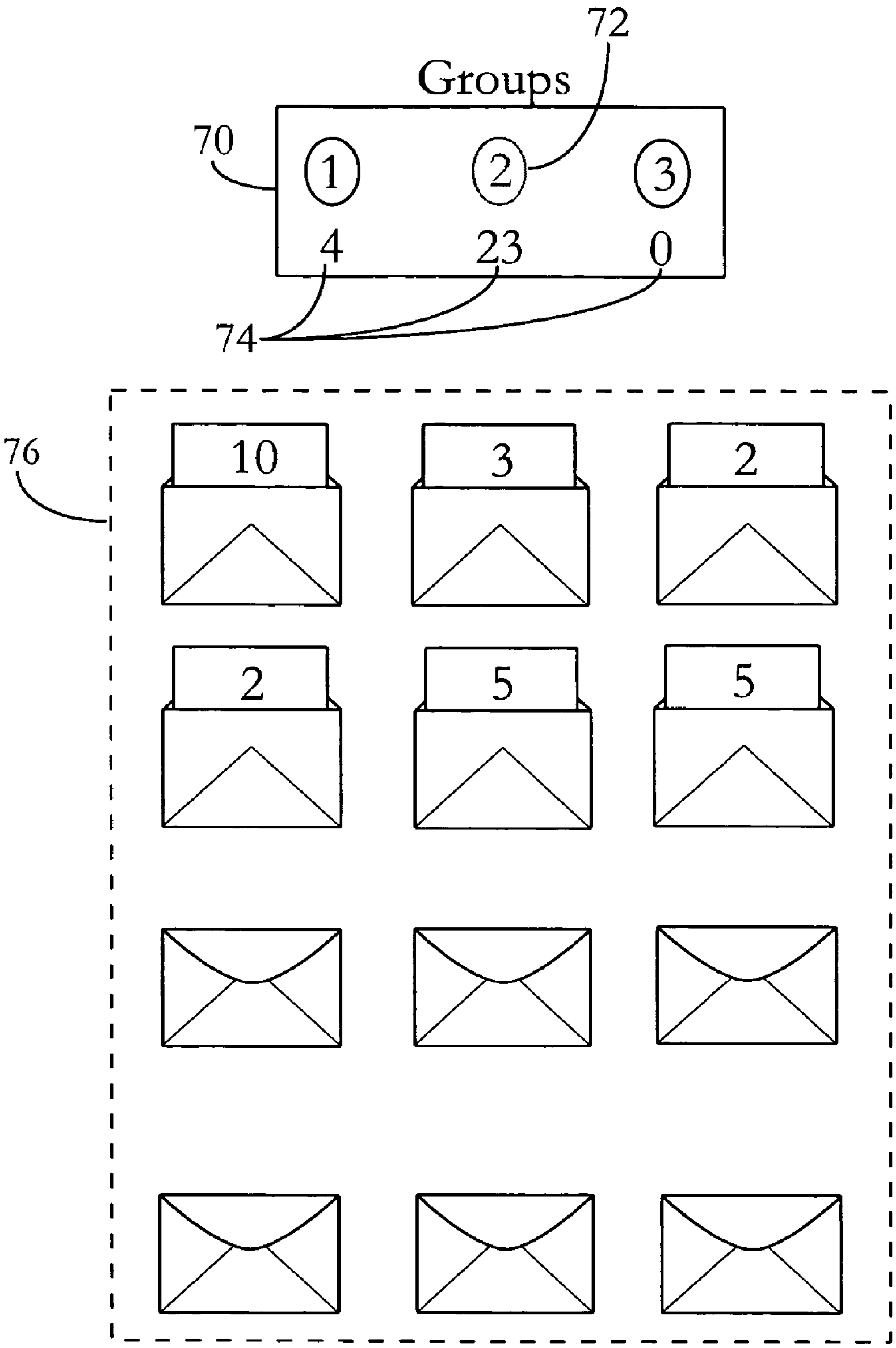
FIG. 6 is a screen shot of a game wherein the positions are not displayed in accordance with an embodiment of the present invention.

FIG. 6 illustrates an example where the positions are not displayed. Before displaying the game, it is randomly determined how many groups are provided to play. In this example, the number of positions in each group is predetermined. In this example, three (3) groups 70 each having four (4) hidden positions, are provided to the player. There must at least be twelve selectable objects 76 so all positions may be occupied. When all positions of a group are occupied, they are marked 72 so the player knows this group is not available for any further selection. In this example, a prize is awarded when all positions of all groups are occupied. The prize is evaluated by adding the values indicated on the counters 74 of the three groups. In this example, the player selects a group and the game completes the selection by revealing and associating to the selected group the selectable objects one at a time in the order they are displayed.

Figure 7:
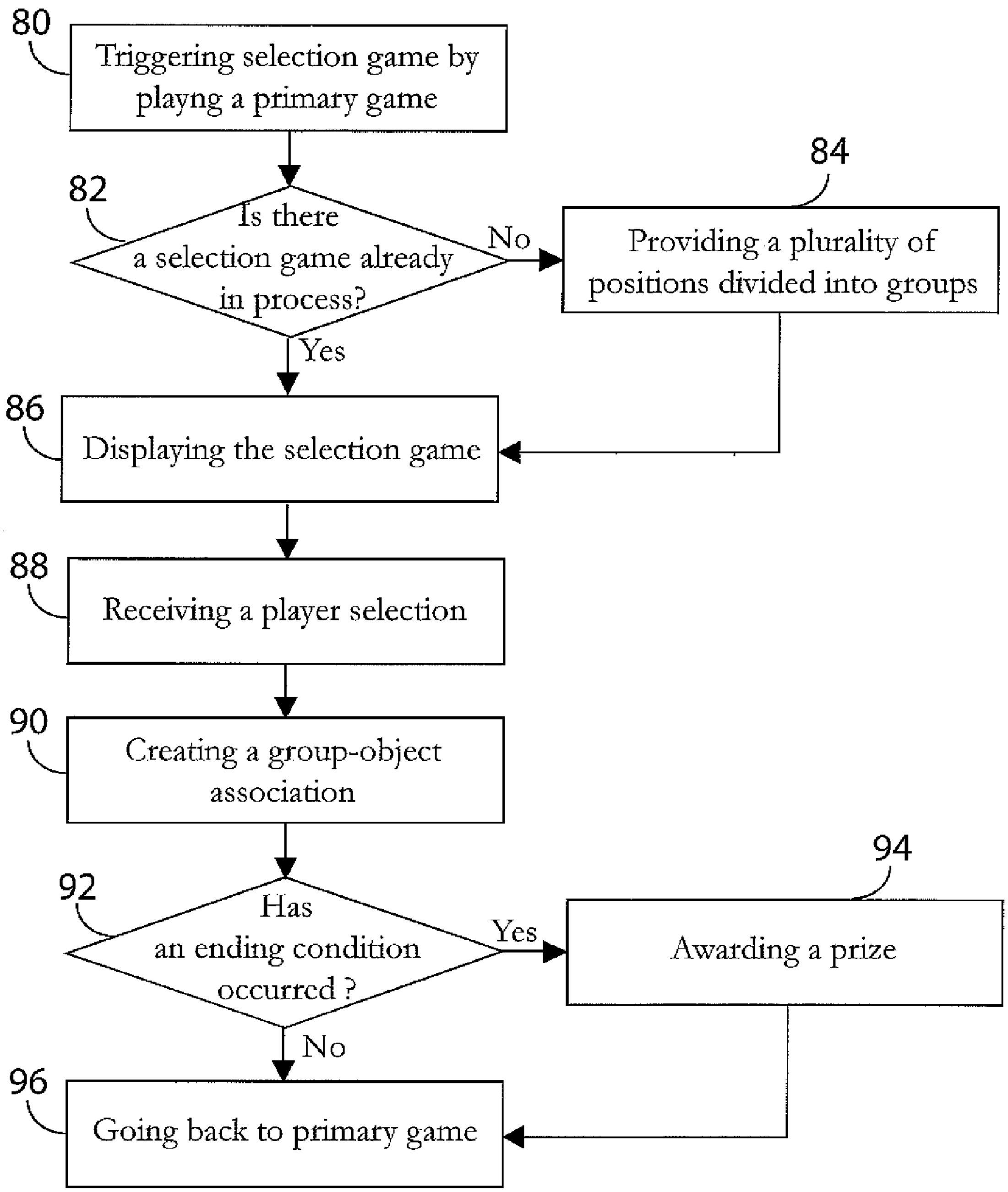
FIG. 7 is a flow chart of a multi-play game process in accordance with the present invention.

Another preferred embodiment is to apply the present invention to a multi-play bonus in which the player makes one selection each time the bonus is triggered. FIG. 7 illustrates the game process of such an embodiment. During the play of a primary game, a predetermined event occurs, which triggers the selection game 80. If a selection game is already in process 82, meaning that it has already been triggered and at least one selection has been made, this selection game, including the selectable elements, already selected or not, is displayed 86. If no selection game was already in play, a plurality of positions, divided into groups, are provided 84 and the selection game is displayed 86, including the selectable elements. A player selection is then received 88 (according to one of the methods described in FIG. 4), and a group-object association is created 90. It is then determined whether or not an ending condition occurs 92. If an ending condition occurs, a prize, based on the player selections, is awarded 94; if not, the player goes back to the primary game 96.

This multi-play embodiment may be used on a stand-alone game apparatus and thus be played by a single player, or be shared over a network by a plurality of players. In the shared version, the players would compete to get the highest prizes, trying to be the one to meet an ending condition.

Figure 8:
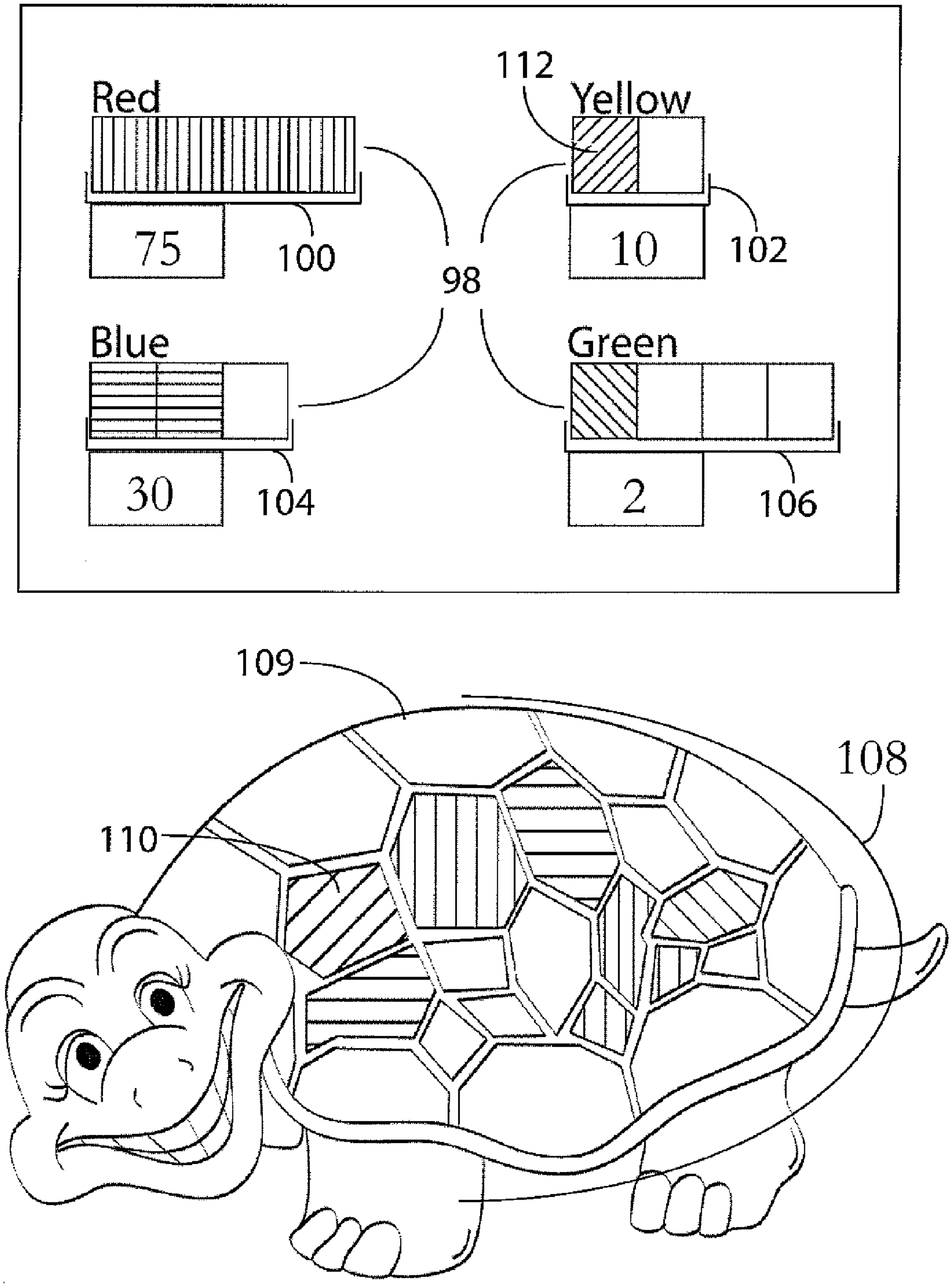
FIG. 8 is a screen shot of a multi-play game shared over a network in accordance with the present invention.

FIG. 8 illustrates a multi-play game shared over a network. The players accessing the selection game are provided with four (4) groups 98, having a randomly determined number of positions, which in this example are: four (4) positions for the red group 100, two (2) positions for the yellow group 102, three (3) positions for the green group 104, and four (4) positions for the blue group 106. Twenty-two (22) selectable objects 108, in this example consisting in sections of the turtle carapace 109, are also provided. The first player accessing the selection game, by obtaining a selection game triggering-event in the primary game, has a choice among all the selectable objects. The group is randomly selected by the game. After a selectable object selection has been received from the player 110, a random number generator determines the group in which a position will be occupied by the value of this selectable object 112. The machine then goes back to the primary game until another selection game triggering-event occurs. The second player to access the selection game will have a choice of any selectable object but the one already selected by the first player. And so on until all the positions of a group are occupied 100, upon which the player having selected the selectable objects completing that group is awarded the value gathered by the counter. The game continues until all groups are completed upon which a number of positions for each group is randomly determined and new groups and selectable objects are provided to the next player to access the selection game.

While illustrated in the block diagrams as groups of discrete components communicating with each other via distinct data signal connections, it will be understood by those skilled in the art that preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiments.

It should be noted that the present invention can be carried out as a method, can be embodied in a system, a computer readable medium or an electrical or electromagnetic signal.

The embodiments of the invention described above are intended to be exemplary only. The scope of the invention is therefore intended to be limited solely by the scope of the appended claims.

I claim:

1. A method of operating on a gaming apparatus a game of chance comprising the steps of:

displaying, on the gaming apparatus, a plurality of groups comprising positions;

displaying, on the gaming apparatus, a plurality of selectable objects, each associated with a hidden predetermined value, said plurality of selectable objects having initially no association with any of said groups or any of specific one of said positions in any of said groups;

creating a group-object association based on a player selection of one of (a) first a group and then separately an object, or (b) a group;

assigning a position from said group to said object for a number of said plurality of selectable objects;

repeating the steps of creating a group-object association and assigning a position until an ending condition has occurred; and awarding a prize based on player selections upon occurrence of said ending condition, wherein the value of said prize is function of said hidden predetermined value of at least part of said number of said plurality of selectable objects that have been assigned a position.

2. The method of claim 1, wherein the step of displaying a plurality of groups comprises displaying said positions.

3. The method of claim 1, wherein the step of displaying a plurality of groups comprises at least one of (a) providing a predetermined number of groups and (b) providing a randomly determined number of groups.

4. The method of claim 3, wherein the step of displaying a plurality of groups comprises one of (a) providing a predetermined number of positions in each group, and (b) providing a randomly determined number of positions in each group.

5. The method of claim 4, wherein the step of displaying a plurality of groups comprising providing groups having the same number of positions.

6. The method of claim 4, wherein the step of displaying a plurality of selectable objects comprises providing a number of selectable objects at least equal to the number of positions.

7. The method of claim 1, wherein the step of receiving a player selection comprises randomly selecting a selectable object.

8. The method of claim 1, wherein the step of providing positions comprises displaying said positions as unoccupied positions.

9. The method of claim 1, wherein the step of awarding a prize occurs when all positions of a group are occupied.

10. The method of claim 9, wherein the step of awarding a prize comprises calculating said prize by adding the values of the selectable objects associated with said group.

11. The method of claim 1, wherein the step of awarding a prize occurs when all positions are occupied.

12. The method of claim 11, wherein the step of awarding a prize comprises determining for each group a group value by adding the values of the selectable objects associated with the positions of said group.

13. The method of claim 12, wherein the step of awarding a prize comprises awarding a prize corresponding to the highest group value.

14. The method of claim 1, wherein said game of chance is a bonus game played upon occurrence of a triggering event in a primary game.

15. The method of claim 14, further comprising going back to said primary game after said group-object association is created.

16. The method of claim 14, wherein said game of chance is shared by a plurality of players.

17. A game apparatus comprising:

display means to display (a) a plurality of groups comprising positions and (b) a plurality of selectable objects, each selectable object being associated with a predetermined value, said plurality of selectable objects having initially no association with any of said groups or any of specific one of said positions in any of said groups;

input means to receive a player selection of one of (a) first a group and then separately an object, or (b) a group;

controller means to create a group-object association based on said player selection and to assign a position from said group to said object for a number of said plurality of selectable objects; and to create new group-object associations based on new player selections until an ending condition has occurred; and awarding means to award a prize based upon a player selections upon occurrence of an ending condition, wherein the value of said prize is function of said predetermined value of at least part of said number of said plurality of selectable objects that have been assigned a position.

18. The gaming apparatus of claim 17, further comprising communication means to communicatively link said game apparatus to another game apparatus.

19. A computer program embodied on non-transitory a computer readable medium or in non-transitory processor-readable memory having codes which, when read by a computer, causes said computer to:

display a plurality of groups comprising positions;

display a plurality of selectable objects, each selectable object being associated with a hidden predetermined value, said plurality of selectable objects having initially no association with any of said groups or any of specific one of said positions in any of said groups;

create a group-object association based on player selection of one of (a) first a group and then separately an object, (b) a group;

assign a position from said group to said object;

create new group-object associations and assign positions until an ending condition has occurred; and award a prize based upon player selections upon occurrence of an ending condition, wherein value of said prize is function of said predetermined value of at least part of said number of said plurality of selectable objects that have been assigned a position.

* * * * *